United States Patent Office 3,296,267
Patented Jan. 3, 1967

3,296,267
PREPARATION OF 2,3-DIHYDROXY-6-QUINOX-
ALINE CARBOXYLIC ACID
John Malcolm Ross, Wilmington, Del., assignor to E. I.
du Pont de Nemours and Company, Wilmington, Del.,
a corporation of Delaware
No Drawing. Filed May 15, 1963, Ser. No. 280,729
5 Claims. (Cl. 260—250)

This invention relates to the preparation of 2,3-dihydroxy-6-quinoxalinecarboxylic acid. More particularly, this invention relates to a novel process for the production of 2,3-dihydroxy-6-quinoxalinecarboxylic acid from p-aminobenzoic acid through the novel intermediary products, namely 4'-carboxyoxanilic acid compounds and 4'-carboxy-2'-nitrooxanilic acid compounds formed in the process steps.

The method previously used to prepare 2,3-dihydroxy-6-quinoxalinecarboxylic acid consisted in condensing 3,4-diaminobenzoic acid with oxalic acid or ethyl oxalate. There are a number of disadvantages to the use of such a process on a commercial scale. The primary disadvantage lies in the scale-up of laboratory methods to plant manufacture of 3,4-diaminobenzoic acid, since preparation of 3,4-diaminobenzoic acid involves several intermediate steps, such as acylation of p-aminobenzoic acid, nitration, hydrolysis, and reduction. Yields are unattractive and the isolation and purification of the 3,4-diaminobenzoic acid itself present problems related to the relative instability often observed with aromatic ortho-diamines. The overall economic picture involved in the preparation of the ultimate product, 2,3-dihydroxy-6-quinoxalinecarboxylic acid, is therefore unattractive using 3,4-diaminobenzoic acid as the starting material.

It has now been discovered that by means of the novel succession of steps in the process of the present invention, that high yields of 2,3-dihydroxy-6-quinoxalinecarboxylic acid are obtained on a commercial scale in an economical manner.

This invention has as an object to provide a novel process for the production of 2,3-dihydroxy-6-quinoxalinecarboxylic acid. A further object is to provide a novel process for the production to 2,3-dihydroxy-6-quinoxalinecarboxylic acid which is both simple and productive of high yields thereby rendering the process commercially and economically practical. A still further object of this invention is to prepare novel intermediary products useful in the preparation of dyes. Other objects will appear hereinafter.

The process for the preparation of 2,3-dihydroxy-6-quinoxalinecarboxylic acid comprises heating p-aminobenzoic acid with an oxalic acid compound of the formula XOOC—COOX, where each X is independently selected from the group of hydrogen, and $C_1$–$C_4$ alkyl, to cause condensation, nitrating the 4'-carboxyoxanilic acid compound formed, hydrogenating the obtained 4'-carboxy-2'-nitrooxanilic acid compound and isolating the product 2,3-dihydroxy-6-quinoxalinecarboxylic acid. The term "4'-carboxyoxanilic acid compounds" is taken hereinafter to means 4'-carboxyoxanilic acid and esters thereof. The term "4'-carboxy-2'-nitrooxanilic acid compounds" is taken hereinafter to mean 4'-carboxy-2'-nitrooxanilic acid and esters thereof.

The foregoing reactions can be graphically indicated as follows:

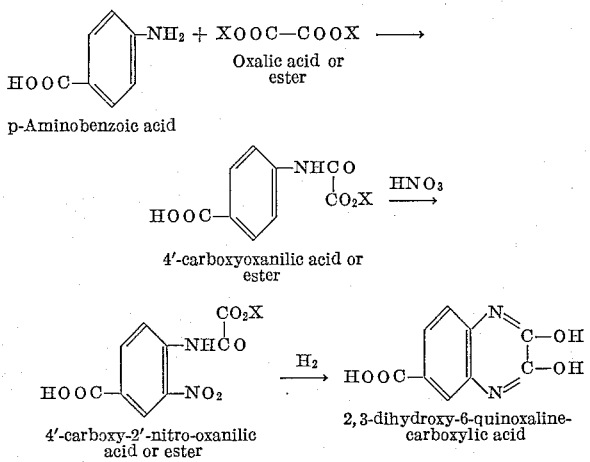

The several steps of the novel process for preparing 2,3-dihydroxy-6-quinoxalinecarboxylic acid are described in detail below:

(A) *Condensation of p-aminobenzoic acid with an oxalic acid compound*

(1) With oxalic acid

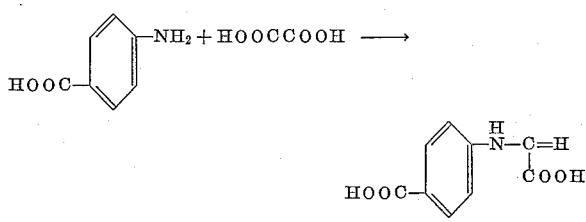

condensation of p-aminobenzoic acid with oxalic acid is achieved simply as shown above by heating together an intimate mixture of the dry reactants at temperatures within the range of from about 160°–200° C., and preferably between 170°–190° C. The mixture is maintained at this temperature with mild agitation for about 1 to 10 hours, preferably 2 to 5 hours. A slight excess of oxalic acid over the theoretical amount (one mol of oxalic acid per mol of p-aminobenzoic acid) is preferred to compensate for minor sublimation losses which occur concurrently with evolution of water generated during the reaction. Dry, solid 4'-carboxyoxanilic acid is obtained as the sole constituent in the reaction vessel.

(2) With oxalates

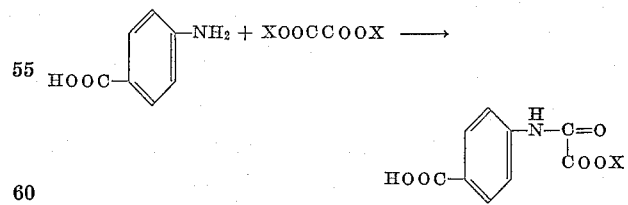

condensation of p-aminobenzoic acid with oxalates, as shown above, where each X is independently selected from the group of hydrogen and $C_1$–$C_4$ alkyl, and at least one X on the oxalate radical is $C_1$–$C_4$ alkyl, is accomplished by dissolving p-aminobenzoic acid in the alkyl oxalate (heating to effect solution) and raising the temperature to about 100° to 150° C., preferably 110° to 135° C. with mild agitation. After about 15 minutes the pure, crystalline product begins to separate. The reaction time is about 2 to 10 hours, preferably 3 to 5 hours. The alcohol generated during the condensation may be distilled from the reaction mixture and used to wash the isolated product. A slight excess of the oxalate over the theoretical equimolar amount may be used. In some cases, it may be found convenient to use a 100% excess of oxalate, the excess being recirculated for further reaction.

(B) *Nitration*

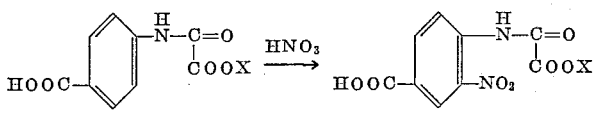

The nitration of the 4'-carboxyoxanilic acid compounds, as shown above, where X is taken from the group of hydrogen and $C_1$–$C_4$ alkyl, proceeds smoothly and efficiently under a wide variety of nitration conditions. One preferred process is as follows:

A slurry of the 4'-carboxyoxanilic acid compound in about 85–88% sulfuric acid is nitrated by the gradual addition of the theoretical amount of 100% nitric acid in concentrated sulfuric acid, e.g., 100%. A slight excess of nitric acid is allowable but too much will enhance over-nitration with the undesired introduction of a second ortho-oriented nitro group. The temperature of the nitration reaction is maintained at about 5° to 15° C., preferably 8° to 12° C. The nitrated product is isolated by drowning the reaction mass into excess water, filtering and washing the product with cold water.

As mentioned above, other nitration techniques may also be used, such as nitration with fuming nitric acid. The wet cake obtained from the nitration may be used directly in the next step of hydrogenation without drying.

(C) *Reductive cyclization*

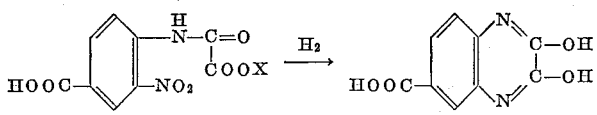

Reduction with accompanying cyclization, as shown above, where X has the same meaning as in step B above, may be achieved under a wide variety of conditions. The 4'-carboxy-2'-nitrooxanilic acid compound is suspended in a liquid medium, such as water, lower alkanol, mixtures of ethanol and water, dioxane or acetic acid. The suspended material may be hydrogenated as such, or a solution of the nitrobody may be formed by addition of a base, for example, $Na_2CO_3$, $NaHCO_3$, and NaOH and the dissolved nitrobody may then be hydrogenated. In some cases, it may be preferred to hydrogenate in aqueous basic solution, for convenience in removing the catalyst residues at the end of the reduction period by clarification prior to isolation of the 2,3-dihydroxy-6-quinoxalinecarboxylic acid by acidification. When the quinoxaline product in a further reaction can be used without clarification from the catalyst, the carboxynitrooxanilate may be hydrogenated in suspension.

The hydrogenation is conducted in the usual manner in a closed system. Air is evacuated and replaced with hydrogen. The required pressure of hydrogen and the temperature limits of the reaction may be varied between wide limits. Since the reaction proceeds efficiently under moderate conditions, there is no need to exceed the temperature limits of between about 25° to 75° C., preferably between 40° to 55° C., and hydrogen pressure of about 50 to 500 p.s.i.g., preferably 100 to 300 p.s.i.g. When the reaction is complete, hydrogen uptake ceases. This is used as a convenient means for determining the necessary reaction time. In reactions in which water is present, or in which the molecule eliminated during cyclization is water, the resultant 2,3-dihydroxy-6-quinoxalinecarboxylic acid is isolated in the form of its stable monohydrate, which may be converted to the dry product on vacuum heating at temperatures of 140° C. and slightly above.

The hydrogenation is preferably achieved in the presence of a catalyst, which may be selected from a wide number of common hydrogenation catalysts, such as, platinum oxides and chlorides, platinum on various carbon supports, palladium oxides and chlorides, supported palladium and mixtures of platinum with palladium. Raney nickel is also a suitable catalyst as are variously activated metallic nickel catalysts. Generally about 1 part or less of catalyst per 1000 parts nitrobody is sufficient.

The following are illustrative but not limitative examples of the novel process for the preparation of 2,3-dihydroxy-6-quinoxalinecarboxylic acid and the useful intermediates formed in the several steps of the process. The parts and relationship of parts are by weight unless stated otherwise.

*4'-carboxyoxanilic acid.*—A mixture of 590 parts dehydrated oxalic acid and 685 parts p-aminobenzoic acid was baked for 3 hours in a rotating vessel immersed in an oil bath at about 190° C. The quantitative yield of product so obtained still contained traces of unreacted p-aminobenzoic acid. Two extractions with boiling 98% ethanol gave pure 4'-carboxyoxanilic acid as the insoluble residue, M.P. sinters at 222° C., does not melt below 400° C.

*Analysis.*—Calc'd. for $C_9H_7NO_5$: C, 51.7; H, 3.4; N, 6.7  Found: C, 51.7; H, 3.3; N, 6.8.

*4'-carboxy-2'-nitrooxanilic acid.*—A slurry of 418 parts 4'-carboxyoxanilic acid in 192 parts 87% sulfuric acid was treated at 7±1° C. with 382 parts of a mixture of concentrated sulfuric acid containing the theoretical amount of fuming nitric acid. The thick yellow slurry was drowned into 3000 parts ice water. The washed and dried cake gave 254 parts pure 4'-carboxy-2'-nitrooxanilic acid which has a double melting point at 211° C., solidifies and remelts at 280°–282° C.

*Analysis.*—Calc'd. for $C_9H_6N_2O_7$: C, 42.5; H, 2.4; N, 11.0; $NO_2$, 18.1.  Found: C, 42.4; H, 2.5; N, 10.9; $NO_2$, 19.1.

Hydrolysis of ethyl 4'-carboxy-2'-nitrooxanilate with 4% sodium hydroxide solution gave on acidification the identical product, M.P. 217 and 280°–282° C.

*Analysis.*—$NO_2$ (calc'd.), 18.1; $NO_2$ (found), 18.3.

*2,3-dihydroxy-6-quinoxalinecarboxylic acid.*—A solution of 705 parts 4'-carboxy-2'-nitrooxanilic acid in 2000 parts water containing 176 parts sodium hydroxide was hydrogenated at 55° C. and 500 p.s.i.g. pressure of hydrogen in the presence of 20 parts of a carbon black supported catalyst containing 5% of a mixture of 90 parts palladium and 10 parts platinum. When the rapid uptake of hydrogen had ceased, the clear greenish solution was clarified and 440 parts 2,3-dihydroxy-6-quinoxalinecarboxylic acid was obtained by precipitation from the filtrate on addition of mineral acid. The product was identified by spectroscopic comparison with authentic samples.

*Ethyl 4'-carboxyoxanilate.*—A suspension of 68.5 parts p-aminobenzoic acid in 270 parts diethyl oxalate was stirred and heated in a constant temperaure bath at 130±2° C. for 15 hours. The crystalline product was collected from the cold reaction mixture, washed with ether and air-dried. The yield of pure ethyl 4'-carboxyoxanilate was 117 parts (99% theory), M.P. 257°–260° C.

*Analysis.*—Calc'd. for $C_{11}H_{11}NO_5$: C, 55.7; H, 4.7; N, 5.9.  Found: C, 55.7; H, 4.8; N, 5.9.

*Ethyl 4'-carboxy-2'-nitrooxanilate.*—A slurry of 116 parts ethyl 4'-carboxyoxanilate in 550 parts 87% sulfuric acid was treated at 10±1° C. with 96 parts of a mixture of concentrated sulfuric acid containing 101.5% theoretical amount of fuming nitric acid. The mixture was stirred for 1 hour and drowned into 1000 parts ice water. The yield of pure ethyl 4′-carboxy-2′-nitrooxanilate after washing and drying was 129 parts (92% theory), M.P. 217–221° C. dec.

*Analysis.*—Calc'd. for $C_{11}H_{10}N_2O_7$: C, 46.8; H, 3.6; N, 9.9; $NO_2$, 16.3. Found: C, 47.0; H, 3.8; N, 9.9; $NO_2$, 16.55.

*2,3-dihydroxy-6-quinoxalinecarboxylic acid.*—A suspension of 282 parts ethyl 4′-carboxy-2′-nitrooxanilate in 2000 parts 98% ethanol was hydrogenated in the presence of 10 parts of 10% palladium on charcoal catalyst at a temperature of 75° C. and a hydrogen pressure of 500 p.s.i.g. When the uptake of hydrogen had ceased, the mixture was cooled and the insoluble product was collected by filtration. 233 parts of 2,3-dihydroxy-6-quinoxalinecarboxylic acid were so obtained, still containing catalyst residues. The catalyst was removed by clarification of a solution of the product in dilute sodium hydroxide solution and the pure 2,3-dihydroxy-6-quinoxalinecarboxylic acid was precipitated by addition of mineral acid. The product was identified by spectroscopic comparison with authentic samples prepared by more conventional routes.

The 2,3-dihydroxy-6-quinoxalinecarboxylic acid produced according to the present novel process is a useful intermediate for the preparation of polyazo dyes as described in British Patent 315,451. The 2,3-dihydroxy-6-quinoxalinecarboxylic acid may also be utilized via 2,3-dichloro-6-quinoxalinecarbonyl chloride to prepare fiber-reactive dyes of the formula:

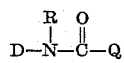

where D is the dye chromophore containing the amine group

R is hydrogen or lower alkyl and the

group is derived from the 6-carbonyl chloride attached to the chloroquinoxaline radical, Q. These dyes, wherein Q actually reacts with a hydroxyl or an amino group in a textile material, represent one of the newest classes of fiber-reactive dyes.

The novel intermediates, 4′-carboxyoxanilic acid, 4′-carboxy-2′-nitrooxanilic acid and their $C_1$–$C_4$ alkyl esters, are of course useful in the preparation of 2,3-dihydroxy-6-quinoxalinecarboxylic acid, as shown above.

What is claimed is:

1. The process for preparing 2,3-dihydroxy-6-quinoxalinecarboxylic acid from p-aminobenzoic acid which comprises heating p-aminobenzoic acid in contact with a compound selected from the group consisting of oxalic acid and $C_1$–$C_4$ alkyl oxalates, to produce the 4′-carboxyoxanilic acid compound, nitrating the 4′-carboxyoxanilic acid compound to produce the 4′-carboxy-2′-nitrooxanilic acid compound, hydrogenating the 4′-carboxy-2′-nitrooxanilic acid compound to produce 2,3-dihydroxy-6-quinoxalinecarboxylic acid and isolating the 2,3-dihydroxy-6-quinoxalinecarboxylic acid.

2. The process for preparing 2,3-dihydroxy-6-quinoxalinecarboxylic acid from p-aminobenzoic acid which comprises heating p-aminobenzoic acid in contact with a compound selected from the group consisting of oxalic acid and $C_1$–$C_4$ alkyl oxalates to produce the 4′-carboxyoxanilic acid compound, nitrating by contacting and reacting the 4′-carboxyoxanilic acid compound with nitric acid, to produce the 4′-carboxy-2′-nitrooxanilic acid compound, hydrogenating by contacting and reacting the 4′-carboxy-2′-nitrooxanilic acid compound with gaseous hydrogen in the presence of a catalyst to produce 2,3-dihydroxy-6-quinoxalinecarboxylic acid and isolating the 2,3-dihydroxy-6-quinoxalinecarboxylic acid.

3. The process for preparing 2,3-dihydroxy-6-quinoxalinecarboxylic acid from p-aminobenzoic acid which comprises heating p-aminobenzoic acid in contact with oxalic acid to produce 4′-carboxyoxanilic acid by condensation, nitrating 4′-carboxyoxanilic acid to produce 4′-carboxy-2′-nitrooxanilic acid, hydrogenating 4′-carboxy-2′-nitrooxanilic acid to produce 2,3-dihydroxy-6-quinoxalinecarboxylic acid and isolating said 2,3-dihydroxy-6-quinoxalinecarboxylic acid.

4. The process for preparing 2,3-dihydroxy-6-quinoxalinecarboxylic acid from p-aminobenzoic acid which comprises heating p-aminobenzoic acid in contact with diethyl oxalate to produce ethyl 4′-carboxyoxanilate by condensation, nitrating ethyl 4′-carboxyoxanilate to produce ethyl 4′-carboxy-2′-nitrooxanilate, hydrogenating ethyl 4′-carboxy-2′-nitrooxanilate to produce 2,3-dihydroxy-6-quinoxalinecarboxylic acid and isolating said 2,3-dihydroxy-6-quinoxalinecarboxylic acid.

5. The process for preparing a 4′-carboxy-2′-nitrooxanilic acid compound which comprises heating p-aminobenzoic acid in contact with an oxalic acid compound selected from the group consisting of oxalic acid and $C_1$–$C_4$ alkyl oxalates to produce the 4′-carboxyoxanilic acid compound, nitrating the 4′-carboxyoxanilic acid compound to produce 4′-carboxy-2′-nitrooxanilic acid compounds of the group selected from 4′-carboxy-2′-nitrooxanilic acid and $C_1$–$C_4$ alkyl oxalates.

References Cited by the Examiner

Yang: Chemical Abstracts, vol. 49 (1955), col. 330a (Abstract of J. Taiwan Pharm. Assoc., vol. 4 (1953), pp. 18–20).

ALEX MAZEL, *Primary Examiner.*

JOHN D. RANDOLPH, *Examiner.*

HENRY R. JILES, *Assistant Examiner.*